(12) United States Patent
Cabibihan et al.

(10) Patent No.: US 12,233,500 B2
(45) Date of Patent: Feb. 25, 2025

(54) FAST-EJECTION SAFETY SYSTEMS FOR HOTWIRE CUTTERS

(71) Applicants: Qatar Foundation for Education, Science and Community Development, Doha (QA); Qatar University, Doha (QA)

(72) Inventors: John-John Cabibihan, Doha (QA); Houssam Abdulrazak, Doha (QA); Zeyad Mansour, Doha (QA)

(73) Assignees: QATAR FOUNDATION FOR EDUCATION, SCIENCE AND COMMUNITY DEVELOPMENT, Doha (QA); QATAR UNIVERSITY, Doha (QA)

( * ) Notice: Subject to any disclaimer, the term of this patent is extended or adjusted under 35 U.S.C. 154(b) by 159 days.

(21) Appl. No.: 17/942,507

(22) Filed: Sep. 12, 2022

(65) Prior Publication Data
US 2023/0079842 A1  Mar. 16, 2023

Related U.S. Application Data

(60) Provisional application No. 63/242,795, filed on Sep. 10, 2021.

(51) Int. Cl.
*B23Q 11/00* (2006.01)
*B26D 7/22* (2006.01)
*B26D 1/00* (2006.01)

(52) U.S. Cl.
CPC ...... *B23Q 11/0089* (2013.01); *B23Q 11/0085* (2013.01); *B26D 7/22* (2013.01); *B26D 2001/008* (2013.01)

(58) Field of Classification Search
CPC .. B23Q 11/0089; B23Q 11/0085; B26D 7/22; B26D 2001/008; B26D 3/00; B26D 1/547; B26D 5/00; B25J 9/16; B26F 3/12; G05B 19/4099
See application file for complete search history.

(56) References Cited

U.S. PATENT DOCUMENTS

| | | |
|---|---|---|
| 5,081,406 A | 1/1992 | Hughes et al. |
| 6,492,902 B2 | 12/2002 | Nishimoto et al. |
| 7,900,541 B2 | 3/2011 | Gass et al. |
| 9,040,822 B2 | 5/2015 | Nieto Lopez |
| 9,673,571 B2 | 6/2017 | Higashi et al. |
| 9,724,840 B2 | 8/2017 | Gass |

(Continued)

FOREIGN PATENT DOCUMENTS

| | | | | |
|---|---|---|---|---|
| CN | 108934530 A | * | 7/2018 | ........... A01G 3/0435 |
| WO | WO-2020245332 A1 | * | 12/2020 | ............ B23K 26/38 |
| WO | WO-2021214064 A1 | * | 10/2021 | ........... B25J 11/0055 |

OTHER PUBLICATIONS

Translation of CN-108934530-A, He et al., Dec. 7, 2018. (Year: 2018).*
Define distance, Microsoft Bing, Apr. 14, 2024 (Year: 2024).*

*Primary Examiner* — Vinh Luong
(74) *Attorney, Agent, or Firm* — K&L Gates LLP

(57) ABSTRACT

Fast-ejection safety systems for hotwire cutters are provided. The safety system comprises a microcontroller, a wire shield, a servo motor and a servo motor arm. The safety system further comprises one or more ultrasonic sensors, a power source, and a safety system casing.

17 Claims, 6 Drawing Sheets

(56) References Cited

U.S. PATENT DOCUMENTS

| | | | |
|---|---|---|---|
| 2009/0133553 A1* | 5/2009 | Gass | B23D 47/08 |
| | | | 83/62.1 |
| 2016/0256967 A1* | 9/2016 | Kell | B23Q 1/50 |
| 2019/0039248 A1* | 2/2019 | Gravesen | B26D 5/06 |
| 2020/0189011 A1* | 6/2020 | Vap | B23Q 1/012 |
| 2021/0237361 A1* | 8/2021 | Sasse | B29B 7/92 |

* cited by examiner

FAST-EJECTION SAFETY SYSTEMS FOR HOTWIRE CUTTERS

CROSS REFERENCE TO RELATED APPLICATION

This application claims the benefit of U.S. provisional patent application No. 63/242,795, filed Sep. 10, 2021, the entire disclosure of which is incorporated herein by reference.

FIELD OF THE INVENTION

Described herein are safety systems for hotwire cutters and their methods of use.

BACKGROUND

Hotwire polystyrene foam cutters are used for automated subtractive manufacturing which is performed by programming a robotic arm to move in a pre-coded pattern to cut the foam using a hot wire. The robotic arm movement is automated without any manual or labor interference, and the reach of these robotic arms are 1-3 m on average while the hot wire is heated to temperatures of 450° C. or higher. The high temperatures of the hot wire make it dangerous for persons around the robotic arm.

Currently, there are no existing technologies that solve the hotwire safety issue, and the only current practice is to keep a safe distance from the hotwire while it is cutting. The safety systems described herein are configured to provide a solution to keep operators and people near/or around the hotwire safe. They also keep surrounding people safe from getting harmed even if they do not follow the safety rules, and attempt to go near the hotwire while it is operating. Thus, there is a need in the art for safety systems for hotwire cutters such as those described herein.

The automation in the manufacturing sector is increasing every year, which is why it is also a factor for the growth of the machining centers market. Machining centers are facing demand for higher accuracy, faster and better production, and the best way to achieve that is by automation and new advanced tools and machines. New advanced machines can have a big initial cost, but reduce the labor and operation cost, and increase the production rate.

This results in manufacturers focusing on inventing and developing new machines and multifaceted tools to supply the demand on the machining centers market. The advantage of having the multifaceted tools is increasing the efficiency of production, saving space since the center requires less machines for the same work.

The machining centers market is a very big market, worth billions of dollars. Big corporations and companies are focusing on developing and acquiring these new machines and technologies to have a bigger market share in this sector.

Disclosed herein are safety systems for hotwire cutters, which promote efficiency within the machining centers market.

SUMMARY

The present disclosure generally relates to fast-ejection safety systems for hotwire cutters.

In light of the present disclosure, and without limiting the scope of the disclosure in any way, in an aspect of the present disclosure, which may be combined with any other aspect listed herein unless specified otherwise, fast-ejection safety systems for hotwire cutters are provided. Safety system and safety mechanism are used interchangeably throughout the disclosure. In some embodiments, a safety mechanism comprises a microcontroller; a wire shield; a servo motor and a servo motor arm. The safety mechanism can further comprise one or more ultrasonic sensors. In some embodiments, the safety mechanism, further comprises a power source. In yet further embodiments, the safety mechanism further comprises a safety system casing. The wire shield is also referred to as a wire expansion shield.

In some embodiments, the safety system casing comprises at least two compartments attached to a platform. One of the at least two compartments can be configured to house the servo motor, and the other of the at least two compartments can be configured to house the wire shield. The servo arm can be configured to attach on top of the at least two compartments.

In other embodiments, the safety mechanism is attached to a robotic arm of a hotwire cutter. The microcontroller can control the safety mechanism. In some embodiments, the one or more ultrasonic sensors sense a movement and send a signal to an actuator. The actuator can trigger the wire shield to deploy and cover a hot wire. In some embodiments, the actuator can be the servo arm.

In some embodiments, a method of using the safety mechanism comprises: attaching the safety mechanism to a robotic arm; a power supply feeding components of the safety mechanism comprising a microcontroller, a wire shield, a servo motor, a servo arm, one or more ultrasonic sensors, and a safety system casing; the one or more ultrasonic sensors reading real time distance data and when the number becomes low, sending a signal to the microcontroller; the microcontroller sending a signal to the servo motor to rotate at an angle; the servo arm connected to the servo motor deploying a wire shield wherein the wire shield covers the hot wire. The microcontroller can send a signal to the servo motor to rotate 90°.

In other embodiments, the safety mechanism can be retracted for reuse. In some embodiments, the retraction is manual. The hot wire is covered to avoid harm to operators and bystanders.

In some embodiments, a safety system comprises a microcontroller to control the system; a wire expansion shield to cover the wire when the system is triggered; a servo motor and a servo motor arm to hold and deploy the safety shield; one or more ultrasonic sensors; a power source; and a safety system casing.

The reader will appreciate the foregoing details, as well as others, upon considering the following detailed description of certain non-limiting embodiments including fast-ejection safety systems for hotwire cutters.

BRIEF DESCRIPTION OF THE DRAWINGS

FIG. 7A illustrates the safety system prior to being triggered. FIG. 7B illustrates the safety system after being triggered.

DETAILED DESCRIPTION

Figure 1:
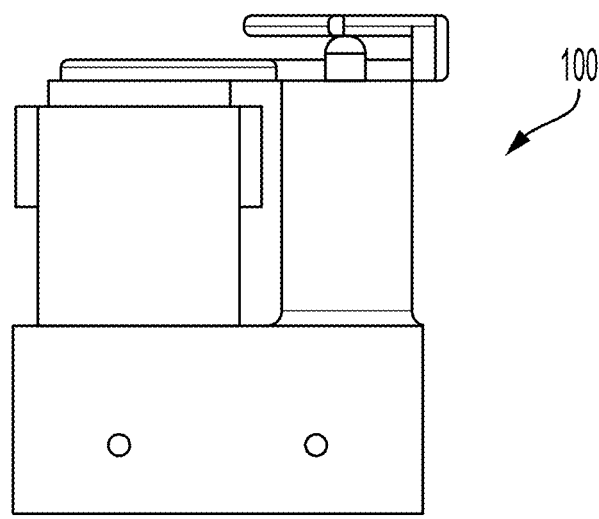
FIG. 1 illustrates a safety system as described herein.
Figure 2:
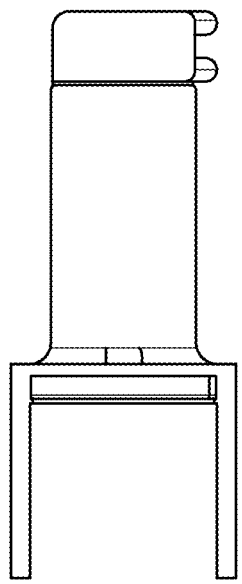
FIG. 2 illustrates a side view of the safety system shown in FIG. 1.
Figure 3:
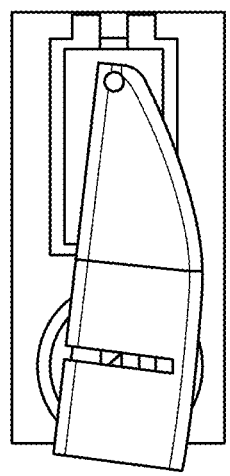
FIG. 3 illustrates a top view of the safety system shown in FIG. 1.
Figure 4:
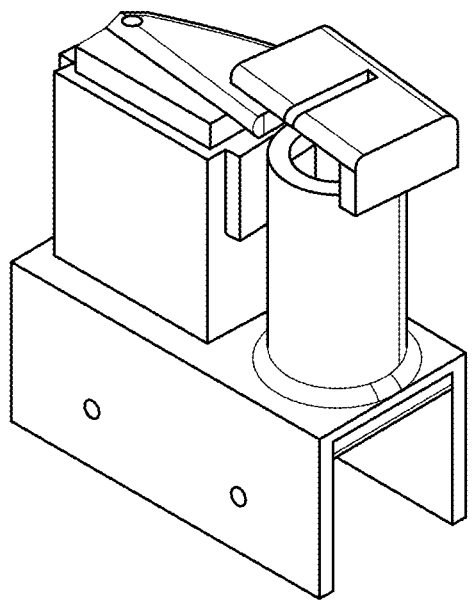
FIG. 4 illustrates a perspective view of the safety system shown in FIG. 1.

The present disclosure generally relates to fast-ejection safety systems for hotwire cutters.

There are no existing technologies that solve the hotwire safety issue, and the only current practice is to keep a safe distance from the hotwire while it is cutting. The safety systems described herein are configured to attach onto a hotwire cutter end effector that is connected to a robotic arm 204. In some embodiments, the safety system is configured to attach onto a hotwire polystyrene foam cutter end effector that is connected to the robotic arm 204. The purpose of the hotwire end effector that is connected to the robotic arm 204 is for automated subtractive manufacturing which is performed by programming the robotic arm 204 to move in a pre-coded pattern to foam using the hot wire 202. Since, the robotic arm 204 movement is automated without any manual or labor interference, and the reach of these robotic arms 204 can reach/extend from 1-3 m on average while the hot wire 202 is heated to temperatures of 450° C. or high, it poses a danger to anyone around the robotic arm 204. Thus, a need exists to develop a safety system for the hot wire tool. These safety systems are described herein generally. Safety systems and safety mechanisms are used interchangeably throughout the specification.

Aspects of the present disclosure may address the above-discussed issues with current hot wire tools.

Referring to FIGS. 1-5, a safety system is illustrated. Safety system 100 generally includes a microcontroller, a wire shield 124, a servo motor 120, servo motor arm 122, one or more ultrasonic sensors 134, a power source, and a safety system casing 126. The wire shield 124 can also be referred to as a wire expansion shield throughout the disclosure.

The microcontroller 130 controls the safety system 100. In some embodiments, the microcontroller 130 is a nano Arduino board or any other comparable board. The wire expansion shield 124 can be deployed to cover the hot wire 202 when the safety system is triggered. In some embodiments, the wire expansion shield 124 is compressed after the safety system 100 is triggered. The wire expansion shield 124 is not compressed before the safety system 100 is triggered. The servo motor 120 controls movement of the servo motor arm 122. The servo motor arm 122 can hold and deploy the wire shield 124 as needed. In some embodiments, the power source/supply can run the microcontroller 130 and the servo motor 120.

Figure 5:
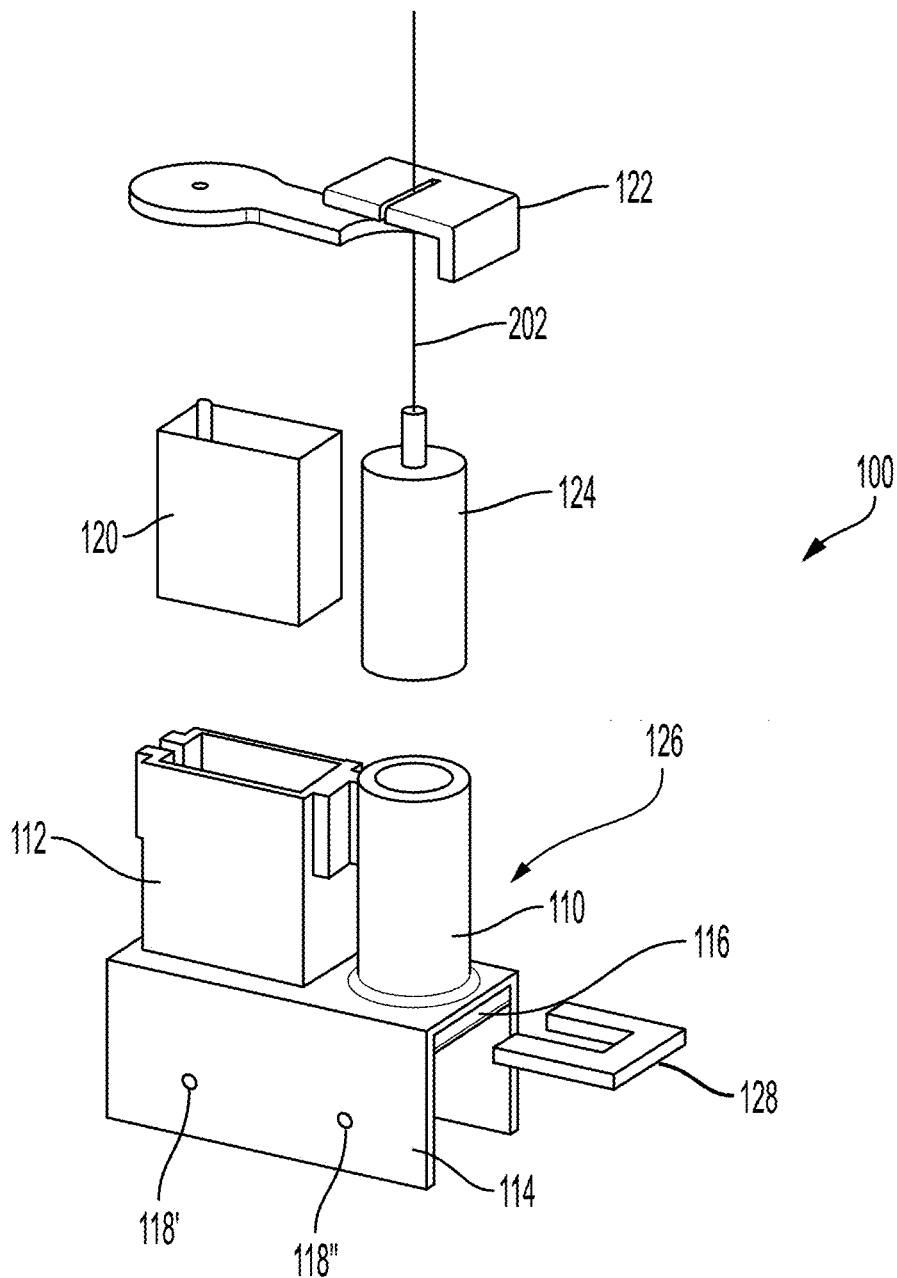
FIG. 5 illustrates an exploded view of FIG. 1 showing a detailed schematic of the components.

The safety system casing 126 can hold all or part of the components. Referring to FIG. 5, the safety system casing 126 comprises at least two compartments 110, 112 configured to attach to platform 114. Platform 114 can further comprise at least one slot 116 configured to receive a wire shield back gate 128. In some embodiments, platform 114 can comprise more than one slot 116. Platform 114 can additionally comprise at least two points of attachment 118', 118". The at least two points of attachments can be configured to attach the safety system casing 126 and its mechanical components, i.e. the entire safety system 100 to a robotic arm 204. The safety system 100 can be configured to attach to the robotic arm 204 via screws or any other type of fasteners. In some embodiments, platform 114 includes two points of attachment on one side and two points of attachment on the opposite side. Platform 114 can be hollow or solid.

Compartment 110 can be configured to receive the wire shield 124 (wire shield 124 and wire expansion shield are used interchangeably throughout the disclosure). Compartment 110 can be substantially circular or any other shape in order to receive the wire shield 124. The wire shield 124 can be housed in compartment 110. Compartment 112 can be configured to receive the servo motor 120. Compartment 112 can be substantially rectangular or any other shape in order to receive the servo motor 120. The servo moto can be housed in compartment 112. The servo motor arm 122 can be configured to attach or rest on top of the servo motor 120 and the wire shield 124.

The safety system 100 and all its components can be made of various materials. The materials can be any type of materials that are able to withstand temperatures of high heat.

Figure 6:
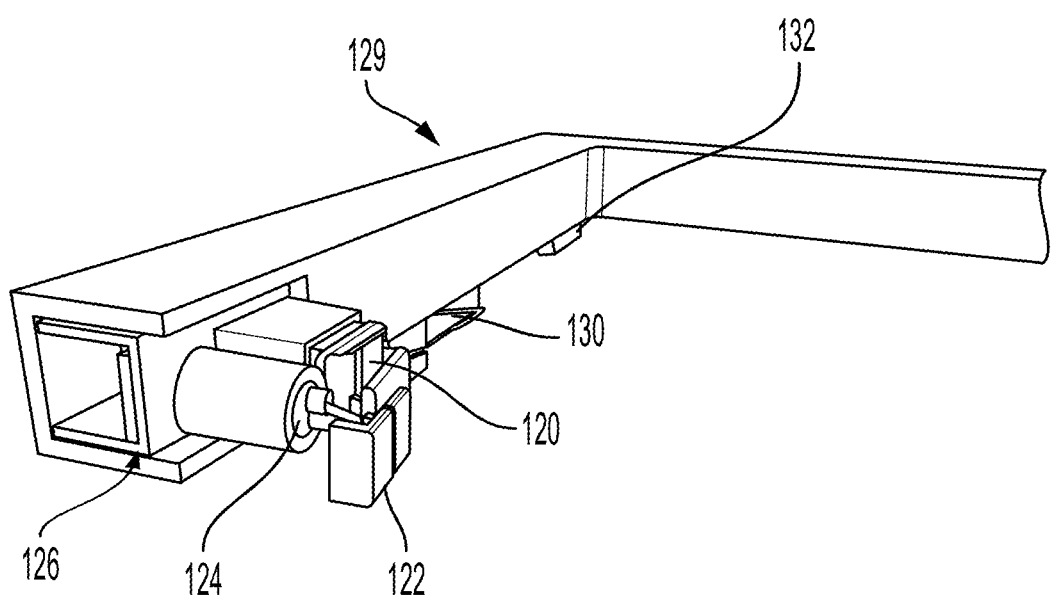
FIG. 6 illustrates a safety system described herein attached to a robotic arm with a hot wire attachment.

Referring to FIG. 6, it illustrates an example embodiment of the safety system 100 attached to a robotic arm 204. In some embodiments, the safety system 100 can be configured to slide into/onto the robotic arm 204 through a friction fit. In other embodiments, the safety system 100 can be configured to attach to the robotic arm 204 views screws and/or any type of fastener(s).

Figure 7A:
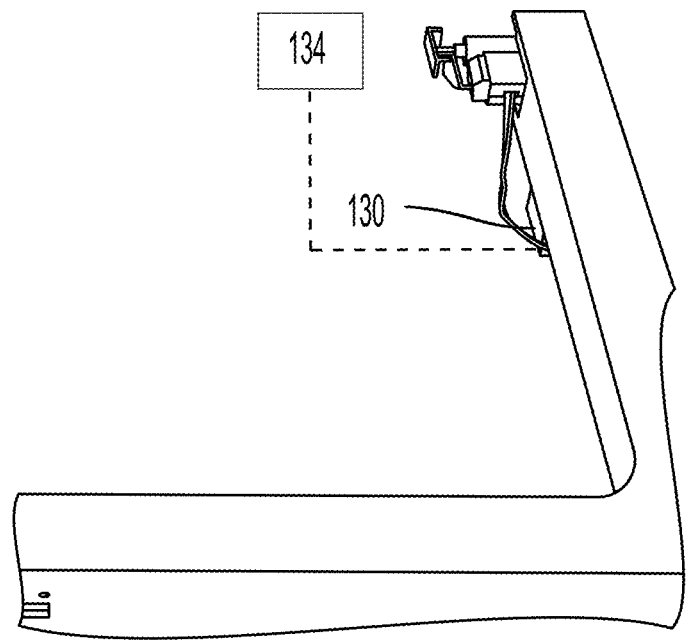
FIGS. 7A-B illustrate the safety system before and after being triggered.
Figure 7B:
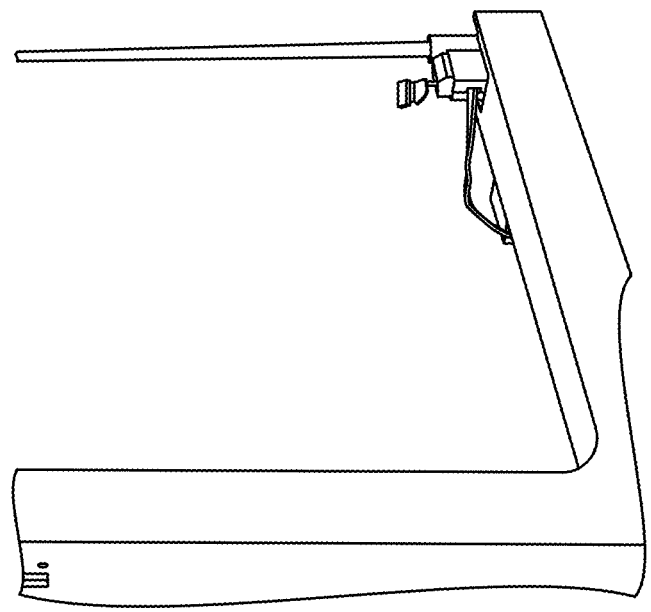

According to some embodiments of the present disclosure, a safety system 100 can comprise a microcontroller 130 to control the system; a compressed wire expansion shield 124 to cover the wire when the system is triggered; a servo motor 120 and a servo motor arm 122 to hold and deploy the wire expansion shield 124; one or more ultrasonic sensors 134; a power source 132; and a safety system casing 126. In other embodiments, the safety system 100 can further comprise a wire shield back gate 128. Referring to FIG. 7A, it demonstrates the safety system 100 prior to being triggered, i.e. the servo arm 122 is in position and holding the wire shield 124 in place. Referring to FIG. 7B, it demonstrates the safety system 100 after being triggered, i.e. the servo arm 122 is out of position, and has deployed the wire shield 124 to cover the hot wire 202.

The safety systems 100 described herein can comprise one or more ultrasonic sensors 134. The one or more ultrasonic sensors 134 sense a human presence in the danger zone. In some embodiments, the ultrasonic sensors 134 sense something other than a human presence, e.g. any type of external event/stimuli. In some embodiments, the safety systems comprise 1, 2, 3, 4, 5, 6, 7, 8, 9, 10, at least 1, at least 2, at least 3, at least 4, at least 5, at least 6, at least 7, at least 8, at least 9, at least 10, about 1, about 2, about 3, about 4, about 5, about 6, about 7, about 8, about 9, about 10, more than 1, more than 2, more than 3, more than 4, more than 5, more than 6, more than 7, more than 8, more than 9, more than 10 sensors, between about 1 to about 3, between about 2 to about 4, between about 3 to about 6, between about 5 to about 8, or between about 6 to 11 ultrasonic sensors 134. The ultrasonic sensors 134 can sense movement and distance in the area. Whenever someone gets close to the robotic arm 204, the one or more ultrasonic sensors 134 can send a signal to an actuator which triggers a mechanical safety shield that covers the hot wire 202 from both sides. In some embodiments, the mechanical safety shield is the wire expansion shield 124. In some embodiments, the actuator is the servo arm 122.

The power source can be a direct plug in source or include rechargeable batteries. In some embodiments, the power source is powered by rechargeable batteries. The safety systems 100 can be self-powered by rechargeable batteries, and therefore not need a direct power plug source, which can insure that the safety system 100 keeps working even if the power cuts off, because the wire could stay hot for a few minutes after shutting down the power supply 132 that heats up the wire. In some embodiments, the power source runs the microcontroller and servo motor 120.

The method of using a safety system 100 described herein comprises, attaching the safety system 100 to the robotic arm 204; the power supply 132 feeding all the components through the microcontroller 130 connection; the one or more ultrasonic sensors 134 reading real time distance data and when the number becomes low, it sends a signal to the microcontroller 130; the microcontroller 130 then sends a signal to the servo motor 120 to rotate 90°; and the arm 122 connected to the servo motor 120 moves and releases the compressed wire shield 124, which covers the hot wire 202 so that no one is harmed. The safety device then gets retracted to be reused with the same process.

In some embodiments, the microcontroller 130 can send a signal to servo motor 120 to rotate less than 90°, about 90°, or more than 90°.

The safety system 100 can protect the persons and or operators that are close to the robotic hotwire which can reach temperatures of 450° C. or higher. The safety systems 100 are designed to sense the presence of a person or operator within the dangerous zone and send a signal to the actuator, which triggers the safety device to extend instantly and cover the wire so that no one gets harmed. The safety device is capable of retracting in order to be reused again. In some embodiments, the safety system 100 is retracted manually. Manual retraction can occur in a minute or less. In other embodiments, the safety system 100 further comprises an auto retraction device to provide automatic retraction i.e., manual retraction is not required.

The safety systems 100 described herein provide a safe workplace to all persons or operators using the hot wire method for cutting material, and also persons that happen to be within the vicinity of the hot wire 202. Generally, the safety systems 100 described herein sense the presence of a person within the danger zone and initiate the mechanical components to immediately cover the hot wire 202 before it comes into contact with a person's or operator's hands without harming either the person/operator or the machine. After all the safety measures are taken to make sure that the person or operator is safe and far enough from the danger zone, the mechanical system gets retracted to its compressed position so it can be used again.

The hot wire 202 that is used for cutting different materials could exceed the temperature of 450° which is extremely dangerous and is capable of serious burns and cutting fingers if they get close enough. In many applications, the hot wire 202 is done automatically and people might accidentally get close to the operating part, which can cause extreme injuries that need immediate medical attention. The safety systems 100 described herein provide a safe workplace to all the operators using the hot wire method for cutting the material. The safety systems 100 described herein are also fast and efficient. The system 100 senses the presence of a person within the danger zone and initiates the mechanical components to immediately cover the hot wire 202 before it gets in contact with the person's hands without harming either the person or the machine.

Figure 8:
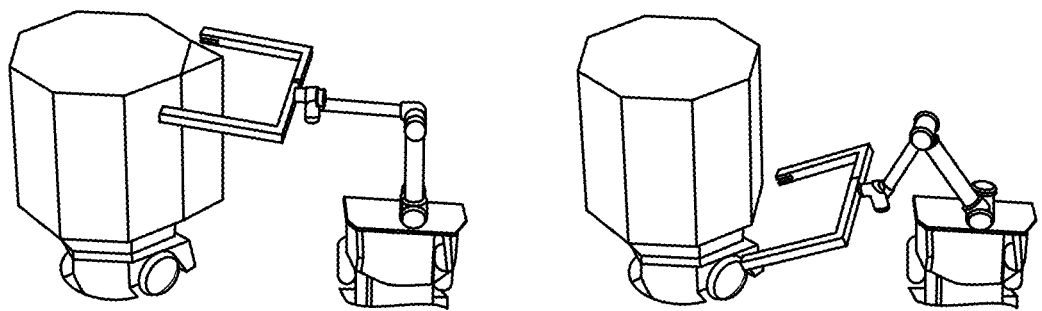
FIG. 8 illustrates the simulation of the movement of an automated foam cutter robot attachment.
Figure 9:
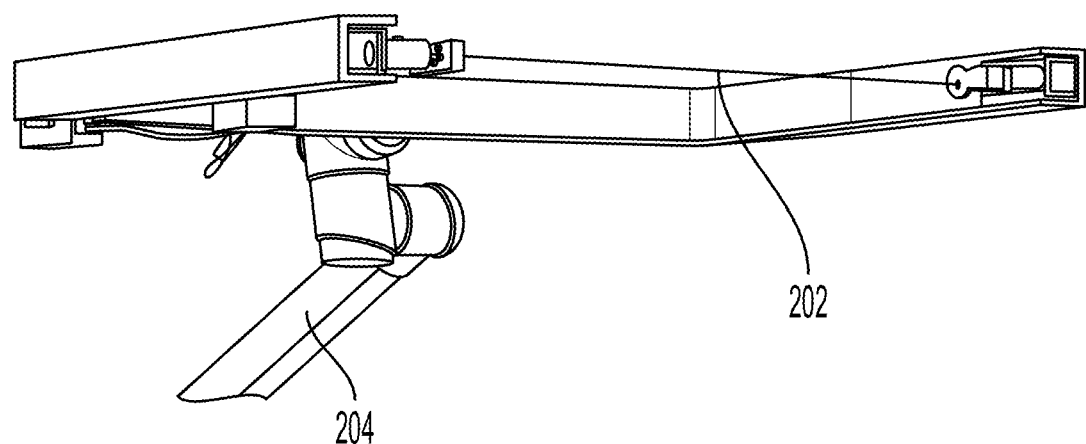
FIG. 9 illustrates an assembled prototype of the safety systems described herein.

The safety systems 100 described herein are for the automated foam cutter robot attachment 129 because the temperature of the device can reach up to 450° C. that could seriously harm a person who comes into contact with it. However, the safety systems 100 can be used for other applications that need a rapid safety system to cover a sharp or hot part of a device, and prevent any close human contact with the dangerous device. Any cutting operation can use such a mechanism. As such, the safety systems 100 described herein can be used for hotwire cutters or other cutting operations. Referring to FIG. 8, it illustrates the simulation of the movement of an automated foam cutter robot attachment 129. In the panel on the left the foam cutter robot attachment 129 starts at the top, in the panel on the left the foam cutter robot attachment 129 has sliced the foam in a downwards motion.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The preceding disclosures are illustrative embodiments. It should be appreciated by those of skill in the art that the devices, techniques and methods disclosed herein elucidate representative embodiments that function well in the practice of the present disclosure. However, those of skill in the art should, in light of the present disclosure, appreciate that many changes can be made in the specific embodiments that are disclosed and still obtain a like or similar result without departing from the spirit and scope of the invention.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a" and "an" and "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided herein is intended merely to better illuminate the invention and does not pose a limitation on the scope of the invention otherwise claimed. No language in the specification should be construed as indicating any non-claimed element essential to the practice of the invention.

The use of the term "or" in the claims is used to mean "and/or" unless explicitly indicated to refer to alternatives only or the alternatives are mutually exclusive, although the disclosure supports a definition that refers to only alternatives and "and/or."

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

Preferred embodiments of this invention are described herein, including the best mode known to the inventors for carrying out the invention. Of course, variations on those preferred embodiments will become apparent to those of ordinary skill in the art upon reading the foregoing description. The inventor expects those of ordinary skill in the art to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Specific embodiments disclosed herein may be further limited in the claims using consisting of or consisting essentially of language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the invention so claimed are inherently or expressly described and enabled herein.

Further, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

The invention claimed is:

1. A safety mechanism comprising:
   a microcontroller;
   a wire shield configured to deploy and cover a hot wire;
   one or more ultrasonic sensors; and
   a servo motor and a servo motor arm,
   wherein the one or more ultrasonic sensors are configured to send a signal to the microcontroller, and the microcontroller is configured to send a signal to the servo motor.

2. The safety mechanism according to claim 1, further comprising:
   a power source.

3. The safety mechanism according to claim 2, further comprising:
   a safety system casing.

4. The safety mechanism of claim 3, wherein the safety system casing comprises at least two compartments attached to a platform.

5. The safety mechanism of claim 4, wherein one of the at least two compartments is configured to house the servo motor.

6. The safety mechanism of claim 5, wherein another of the at least two compartments is configured to house the wire shield.

7. The safety mechanism of claim 6, wherein the servo arm is configured to attach on top of the at least two compartments.

8. The safety mechanism of claim 7, wherein the safety mechanism is attached to a robotic arm of a hotwire cutter.

9. The safety mechanism of claim 8, wherein the microcontroller controls an actuator.

10. The safety mechanism of claim 9, wherein the one or more ultrasonic sensors sense a movement and send a signal to the microcontroller.

11. The safety mechanism of claim 10, wherein the actuator triggers the wire shield to deploy and cover a hot wire.

12. The safety mechanism of claim 11, wherein the actuator is the servo motor arm.

13. A method of using a safety mechanism comprising:
    attaching the safety mechanism to a robotic arm;
    a power supply feeding components of the safety mechanism comprising a microcontroller, a wire shield, a servo motor, a servo arm, one or more ultrasonic sensors, and a safety system casing;
    the one or more ultrasonic sensors reading real time distance data and sending a signal to the microcontroller;
    the microcontroller sending a signal to the servo motor to rotate at an angle;
    the servo arm connected to the servo motor deploying a wire shield wherein the wire shield deploys and covers the hot wire.

14. The method of claim 13, wherein the microcontroller sends a signal to the servo motor to rotate 90°.

15. The method of claim 13, wherein the safety mechanism is retracted for reuse.

16. The method of claim 13, wherein the retraction is manual.

17. The method of claim 13, wherein the hot wire is covered to avoid harm to operators and bystanders.

* * * * *